US009651443B2

(12) United States Patent
Cardinal et al.

(10) Patent No.: US 9,651,443 B2
(45) Date of Patent: May 16, 2017

(54) SYSTEM AND METHOD FOR PROTECTING ROTARY MACHINES

(71) Applicant: General Electric Company, Schenectady, NY (US)

(72) Inventors: Mark Edward Cardinal, Altamont, NY (US); Jignesh Govindlal Gandhi, Simpsonville, SC (US); Robert J. Dewey, Valatie, NY (US); Ryan Spencer Close, Greenville, SC (US); Thomas Ernst Dinjus, Greer, SC (US); Bernardo Adrian Movischoff, Simpsonville, SC (US); David Charles Korim, Albany, NY (US)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 14/298,361

(22) Filed: Jun. 6, 2014

(65) Prior Publication Data
US 2015/0355044 A1 Dec. 10, 2015

(51) Int. Cl.
G01M 1/22 (2006.01)
F03D 1/00 (2006.01)
G01H 1/00 (2006.01)

(52) U.S. Cl.
CPC .............. *G01M 1/22* (2013.01); *F03D 1/008* (2013.01); *G01H 1/003* (2013.01)

(58) Field of Classification Search
CPC ........... G01H 1/003; G01M 1/22; F03D 1/008
USPC ...................................... 73/455, 660; 416/61
See application file for complete search history.

(56) References Cited

U.S. PATENT DOCUMENTS

| 4,098,127 | A | 7/1978 | Shiga et al. |
| 4,463,317 | A | 7/1984 | Kusakabe |
| 6,891,280 | B2 | 5/2005 | Siegfriedsen |
| 7,417,332 | B2 | 8/2008 | Malakhova et al. |

(Continued)

FOREIGN PATENT DOCUMENTS

| EP | 2458204 A1 | 5/2012 |
| FR | 2692668 A1 | 12/1993 |

OTHER PUBLICATIONS

European Search Report and Opinion issued in connection with corresponding EP Application No. 15170132.3 on Nov. 30, 2015.

*Primary Examiner* — John Chapman, Jr.
(74) *Attorney, Agent, or Firm* — Dority & Manning, P.A.

(57) ABSTRACT

The present disclosure is directed to a system and method for protecting a rotary machine in a high noise environment. In one embodiment, the method includes a step of measuring a vibration signal during operation of the rotary machine. Another step includes modulating the vibration signal at a desired frequency to generate a modulated signal having a direct current (DC) value. The desired frequency varies as a function of an operational parameter of the rotary machine. The method also includes a step of filtering the modulated signal via one or more low-pass filters. Another step includes comparing an amplitude of the filtered signal to a threshold amplitude for one or more components of the rotary machine. The threshold amplitude is indicative of an imbalance within one or more components of the rotary machine. The rotary machine is then operated based on the comparison so as to protect the rotary machine from damage caused by the imbalance within the one or more components of the rotary machine.

20 Claims, 7 Drawing Sheets

(56) References Cited

U.S. PATENT DOCUMENTS

| | | | |
|---|---|---|---|
| 7,692,324 B2 | 4/2010 | Malakhova et al. | |
| 8,044,670 B2 | 10/2011 | Bjerge et al. | |
| 8,261,599 B2 * | 9/2012 | Jeffrey | F03D 1/008 415/1 |
| 8,364,424 B2 | 1/2013 | Lou et al. | |
| 8,506,249 B2 | 8/2013 | Egedal | |
| 8,612,182 B2 | 12/2013 | Hess et al. | |
| 8,714,924 B2 | 5/2014 | Egedal | |
| 2008/0197962 A1 | 8/2008 | Steenkamp et al. | |
| 2010/0237808 A1 | 9/2010 | Kwon et al. | |
| 2011/0251804 A1 | 10/2011 | Hess et al. | |
| 2012/0173172 A1 | 7/2012 | Laurberg et al. | |
| 2012/0257967 A1 | 10/2012 | Egedal et al. | |
| 2014/0012516 A1 | 1/2014 | Nielsen | |
| 2014/0070756 A1 | 3/2014 | Kearns et al. | |

* cited by examiner

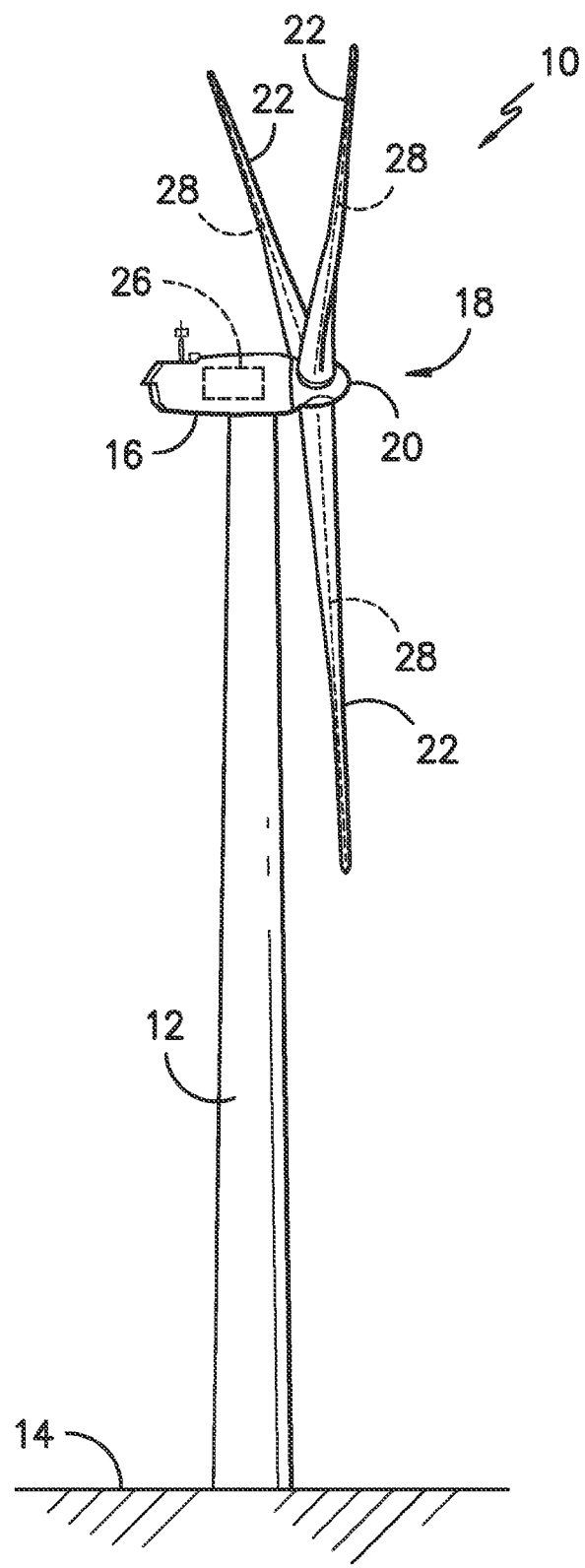
FIG. -1-

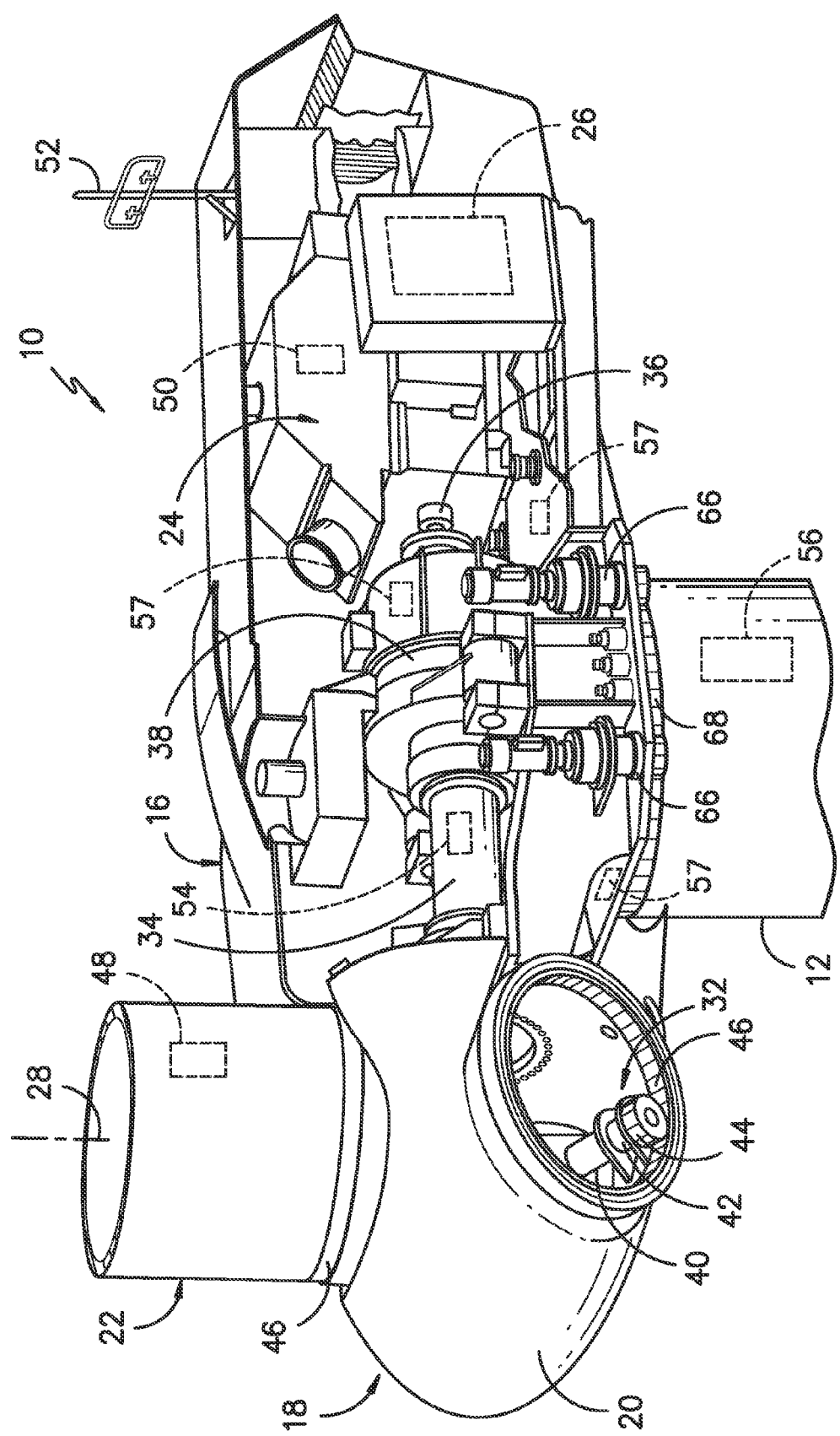
FIG. -2-

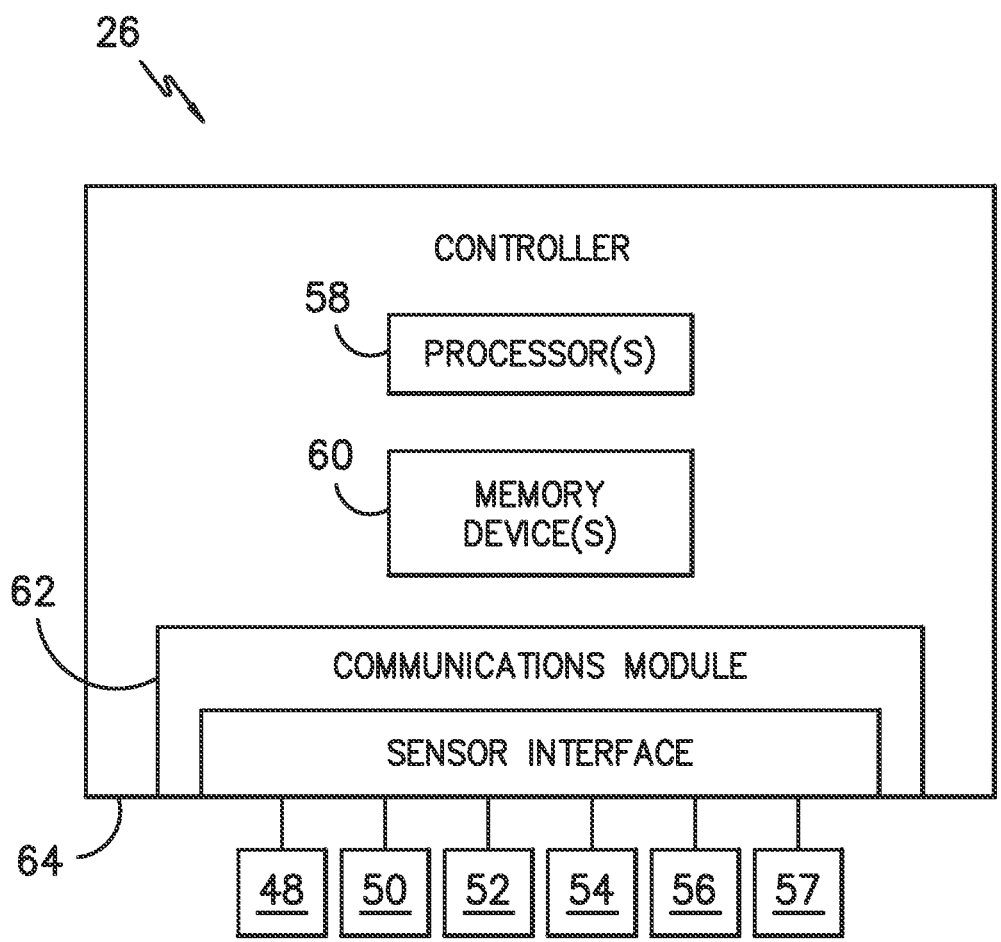
FIG. -3-

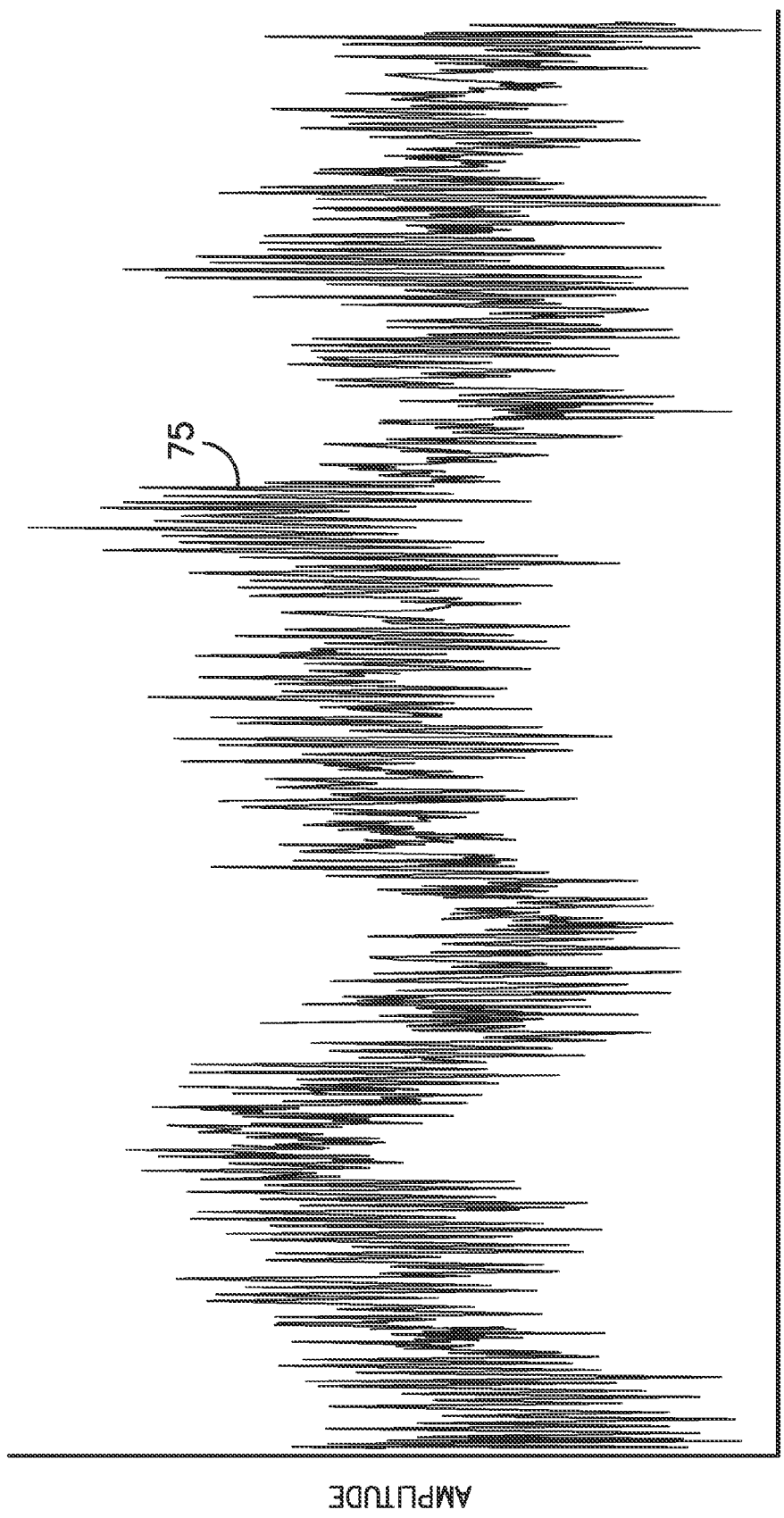
FIG. -4-

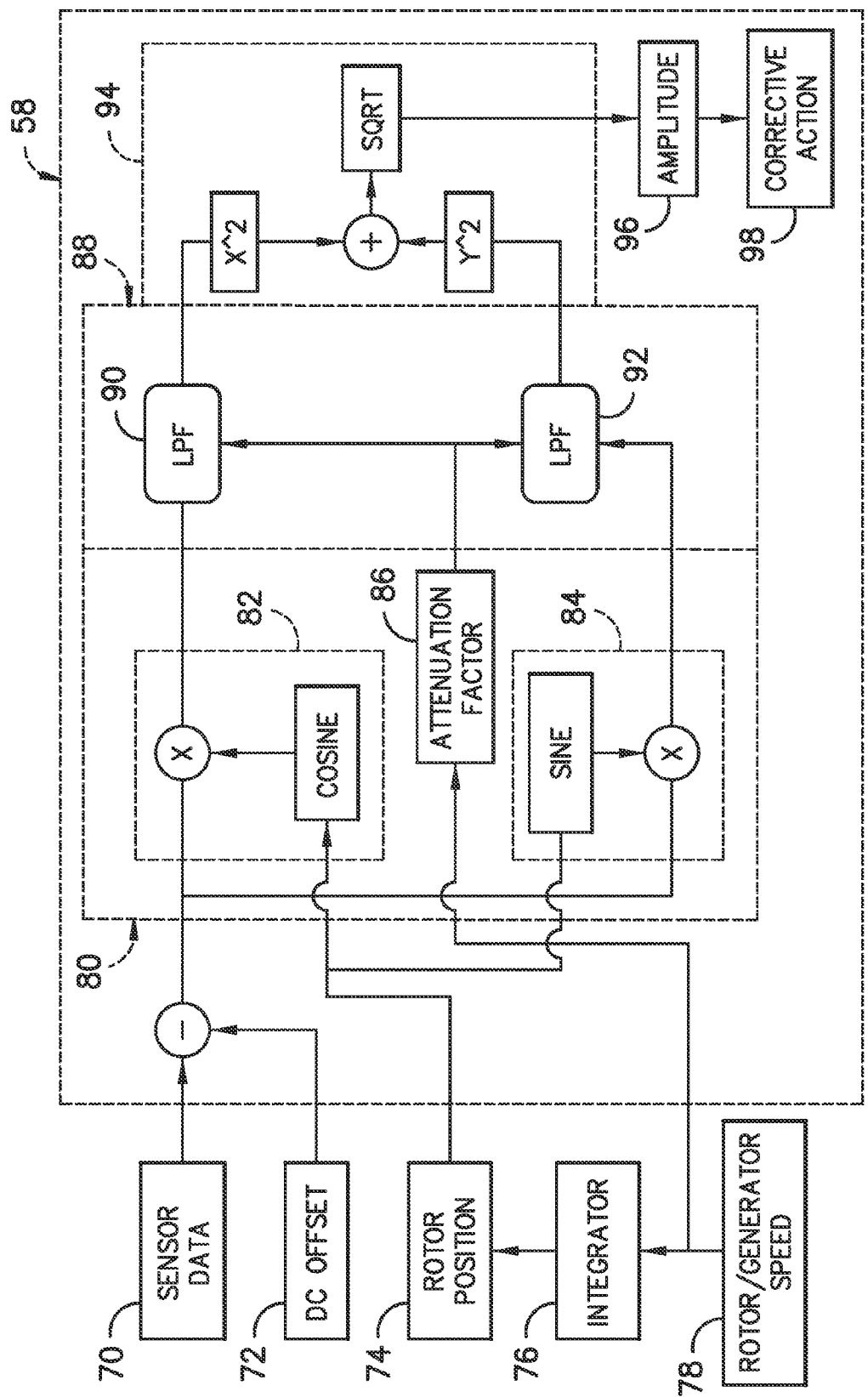
FIG. -5-

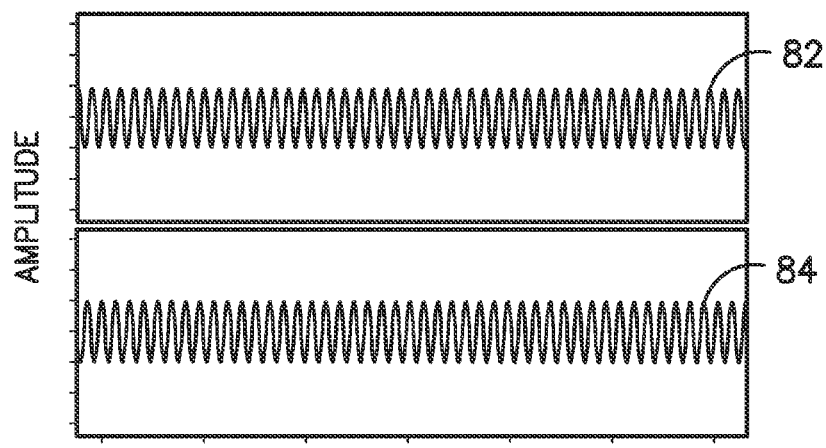
FIG. -6-
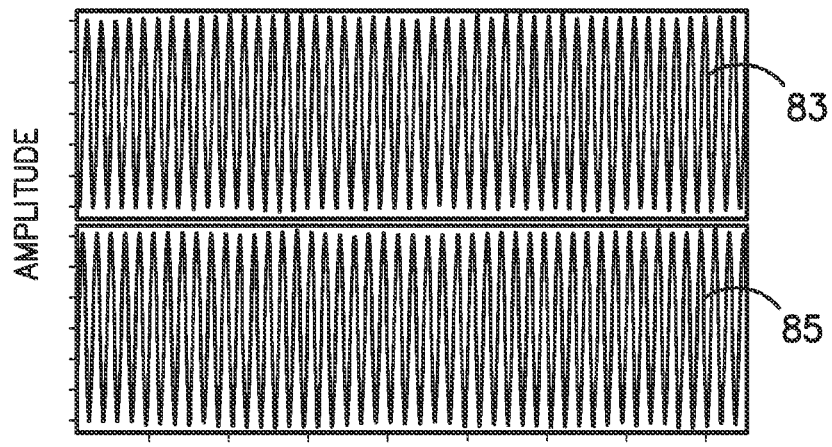
FIG. -7-
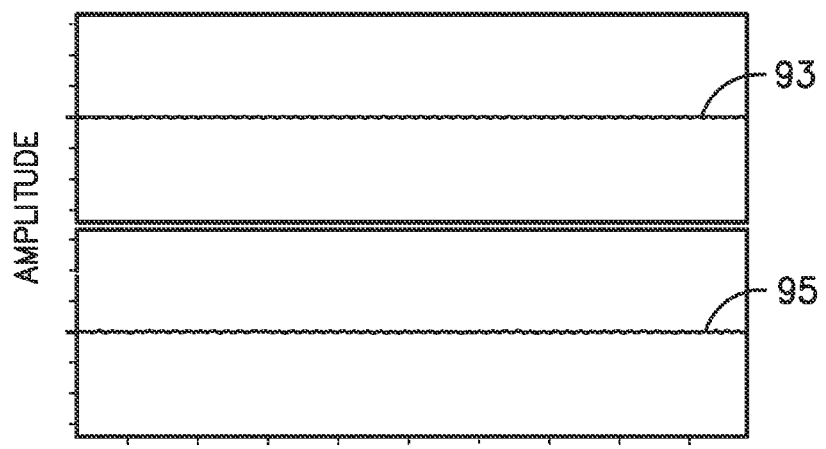
FIG. -8-

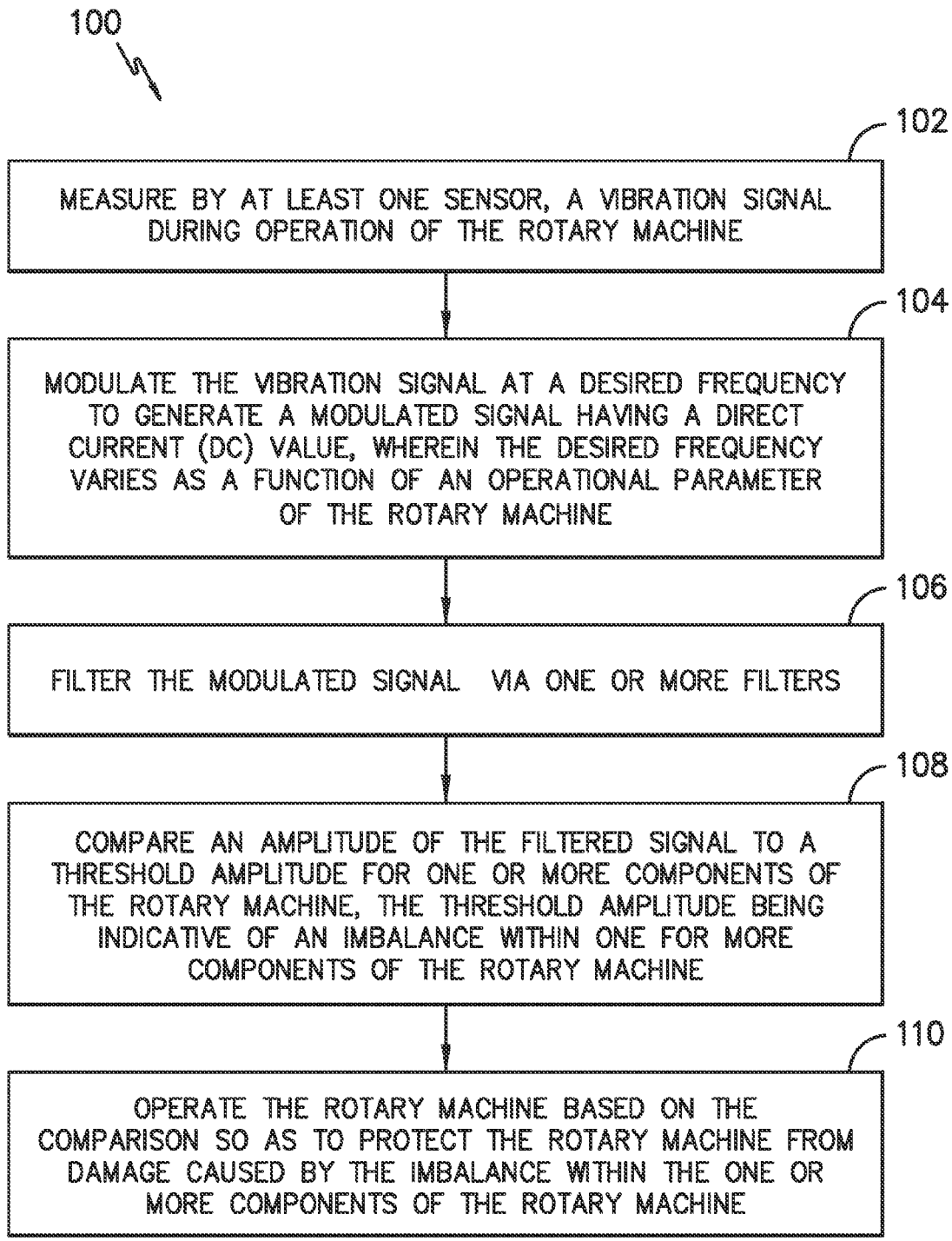
FIG. -9-

SYSTEM AND METHOD FOR PROTECTING ROTARY MACHINES

FIELD OF THE INVENTION

The present invention relates generally to rotary machines, and more particularly to a system and method for protecting rotary machines using a simple, frequency discriminator.

BACKGROUND OF THE INVENTION

Rotary machines, such as large turbine-generator units driven by gas, steam, or wind, are commonly known machines used to produce electric power. Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During installation and/or operation of a rotary machine, it is common for the machine to become imbalanced. For example, during installation of a wind turbine, faulty blade-zero marking or high pitch offsets may result in excessive vibration in the generator frame. In addition, manufacturing tolerances of the generator typically cause the generator to have a mass imbalance about its longitudinal axis, which causes vibrations within the wind turbine.

Rotary machines are designed to withstand a certain amount of vibrations; however, excessive vibrations can lead to the eventual wearing out, or even sudden failure, of machine parts. Further, replacement of vibration-worn parts of the rotary machine can require the unit to be taken off-line, increasing both time and expenses associated with the rotary machine. Thus, it would be advantageous to detect such vibrations before such damage occurs.

To facilitate preventing damage to the machine, the machine components are commonly monitored to detect performance issues, e.g. excessive vibrations that may cause component failure or damage. For example, certain conventional control technologies primarily focus on utilizing the phase lock loop (PLL), which is a control system that generates an output signal having a phase that is related to the phase of an input signal. For example, for a wind turbine, such a system detects a vibration signal of a rotor having a phase and relates it to a desired phase for the rotor. The system then adjusts the vibration signal to keep the phases matched. Such a control technology involves complex calculations and is sensitive to noise within the vibration signal that can lead to skewed results or incorrect detection of a particular frequency in the output signal.

Accordingly, an improved system and method that detects excessive vibrations and implements a corrective action so as to protect the rotary machine before damage occurs would be advantageous. More specifically, an improved system and method for protecting a rotary machine that addresses the aforementioned issued would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for identifying an imbalance condition within a rotary machine in a high noise environment. The method includes a step of measuring, by at least one sensor, a vibration signal during operation of the rotary machine. Another step includes modulating the vibration signal at a desired frequency to generate a modulated signal having a direct current (DC) value. The desired frequency varies as a function of an operational parameter of the rotary machine. The method also includes a step of filtering the modulated signal via one or more filters. Another step includes comparing an amplitude of the filtered signal to a threshold amplitude for one or more components of the rotary machine. The threshold amplitude is indicative of an imbalance within one or more components of the rotary machine.

In one embodiment, the method further includes implementing a corrective action to the rotary machine when the amplitude of the filtered signal exceeds the threshold amplitude so as to protect the rotary machine from damage caused by the imbalance within the one or more components of the rotary machine. For example, in various embodiments, the corrective action may include shutting down the rotary machine, de-rating the rotary machine, or any other suitable control action.

In one embodiment, the step of modulating the vibration signal includes multiplying the frequency of the vibration signal with sinuisoidals of the desired frequency. In another embodiment, the one or more filters includes at least one low-pass filter. In further embodiments, the operational parameter of the rotary machine includes any one of or combination of the following: a speed of the rotary machine, a position of one or more components of the rotary machine, harmonics of one of more components of the rotary machine, or any other suitable operational parameters. In another embodiment, the method may also include filtering the vibration signal before modulating the vibration signal via at least one of a band-pass filter or a high-pass filter.

In additional embodiments, the at least one sensor may include any suitable sensor known in the art, such as for example, a proximity sensor, an accelerometer, a strain gauge, a speed encoder, a Miniature Inertial Measurement Unit (MIMU), a vibration sensor, or similar. In one embodiment, the vibration signal may have a signal-to-noise ratio of less than 1:1.

In various embodiments, the method may also include determining the threshold amplitude based on one or more field measurements that are indicate of safe operation of the rotary machine. More specifically, the step of determining the threshold amplitude based on one or more field measurements may include balancing the rotary machine; measuring one or more initial oscillations during operation of the rotary machine; altering one or more operational parameters of the rotary machine; measuring one or more subsequent oscillations of the rotary machine in response to altering the one or more operational parameters of the rotary machine; determining a difference between the initial oscillations and the subsequent oscillations; and based on the difference, determining the threshold amplitude for one or more components of the rotary machine.

It should be understood that the rotary machine may include any rotary machine known in the art, including but not limited to a wind turbine, a gas turbine, a hydroelectric generator, a steam turbine, or similar.

In another aspect, the present disclosure is directed to a system for protecting a rotary machine in a high noise environment. The system includes one or more sensors configured to measure a vibration signal during operation of the rotary machine; a processor communicatively coupled to the one or more sensors, and a controller communicatively coupled to the processor. The processor is configured to perform one or more operations, including but not limited to modulating the vibration signal at a desired frequency to generate a modulated signal having a direct current (DC) value, wherein the desired frequency varies as a function of an operational parameter of the rotary machine, filtering the modulated signal via one or more filters, and comparing an amplitude of the filtered signal to a threshold amplitude for one or more components of the rotary machine, the threshold amplitude being indicative of an imbalance within one or more components of the rotary machine. The controller is also configured to perform one or more operations, including but not limited to operating the rotary machine based on the comparison so as to protect the rotary machine from damage caused by the imbalance within the one or more components of the rotary machine.

In yet another aspect, the present disclosure is directed to a method for protecting a wind turbine in a high noise environment. The method includes measuring, by at least one sensor, a vibration signal during operation of the wind turbine. Another step includes modulating the vibration signal at a desired frequency to generate a modulated signal having a direct current (DC) value. The desired frequency varies as a function of an operational parameter of the wind turbine. A next step includes filtering the modulated signal via one or more filters. The method may also include comparing an amplitude of the filtered signal to a threshold amplitude for a rotor of the wind turbine. The threshold amplitude is indicative of an imbalance of the rotor of the wind turbine. A next step includes operating the wind turbine based on the comparison so as to protect the wind turbine from damage caused by the imbalance of the one or more components of the wind turbine. The method for protecting a wind turbine may also include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine in accordance with the present disclosure;

FIG. 2 illustrates a simplified, internal view of one embodiment of a nacelle of a wind turbine;

FIG. 3 illustrates a schematic diagram of one embodiment of a controller according to the present disclosure;

FIG. 4 illustrates a graph of one embodiment of a measured vibration signal pre-modulation according to the present disclosure;

FIG. 5 illustrates a schematic diagram of one embodiment of a system for protecting a rotary machine according to the present disclosure;

FIG. 6 illustrates graphs of a Sine modulating signal (top) and Cosine modulating signal (bottom) according to the present disclosure;

FIG. 7 illustrates graphs of a measured vibration signal that has been modulated at a Sine waveform of a known frequency (top) and a Cosine waveform of a known frequency (bottom) according to the present disclosure;

FIG. 8 illustrates graphs of a measured vibration signal that has been modulated at a Sine waveform of a known frequency and filtered (top) and a Cosine waveform of a known frequency and filtered (bottom) according to the present disclosure; and, FIG. 9 illustrates a flow diagram of one embodiment of a method for protecting a rotary machine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for identifying an imbalance within a rotary machine in a high noise environment and protecting the rotary machine from damage caused by the imbalance. More specifically, in one embodiment, the system is configured to measure the low amplitude (peak-to-peak) of the first excitation frequency (1P) or rotational speed of a rotor of a wind turbine. For example, at least one sensor measures a vibration signal within the rotor during operation of the wind turbine, which typically operates in a high noise and direct current (DC) component environment. Next, the system modulates the noisy data signal at a desired frequency to generate a modulated signal so as to convert the vibration signal to a direct current (DC) value. As such, the modulated signal can then be easily filtered via a low pass filter. After filtering, the amplitude of the filtered signal can be easily extracted and compared to a threshold amplitude for the rotor of the wind turbine. The threshold amplitude is chosen so as to ensure safe operation of the machine, therefore, if the amplitude of the modulated signal exceeds the amplitude of the threshold amplitude, the wind turbine is shut down to prevent damage caused by the 1P frequency.

The present disclosure has many advantages not present in the cited art. For example, the present disclosure it not limited to detecting 1P frequencies, but can reliably detect any low frequency amplitude in a high noise environment (e.g. 2P, 3P, and so on). Further, the present disclosure can be implemented using one or more simple, low-pass filters and does not require complex filtering. In addition, it should be understood that the following description explains the present disclosure as it relates to a wind turbine, however, the present disclosure can be implemented with any type of rotary machine, including but not limited to a wind turbine, a gas turbine, a hydroelectric generator, a steam turbine, or similar. As such, the figures and description are meant to be illustrative of one embodiment and are not intended to be limiting.

Referring now to the drawings, FIG. 1 illustrates a perspective view of one embodiment of a variable speed wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or implement a corrective action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences) and/or de-rating or up-rating the wind turbine, which will be discussed in more detail below.

Referring now to FIG. 2, a simplified, internal view of one embodiment of the nacelle 16 of the wind turbine 10 shown in FIG. 3 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

In addition, the wind turbine 10 may also include one or more sensors 48, 50, 52, 54, 56, 57 for monitoring various loading conditions and/or operational parameters of the wind turbine 10. As used herein, the term "loading parameter" may refer to any suitable loading condition and/or parameter that relates to a load acting on the wind turbine 10. For instance, loading conditions may include, but are not limited to, any load or moment acting on one of or a combination of the rotor blades 22, the rotor 18, the hub 20, the nacelle 16, the main shaft 34, the generator 24, the tower 12 or other similar component of the wind turbine 10. Further, the term "operational parameter" as used herein may refer to any suitable operating condition and/or parameter that relates to operation of the wind turbine 10 so as to provide information regarding the current or real-time operational state of the wind turbine. For instance, operating conditions may include, but are not limited to, a rotor speed, a generator speed, a position of one or more components of the wind turbine 10, or harmonics of one or more components of the wind turbine 10, or similar.

Still referring to FIG. 2, the one or more sensors may include blade sensors 48 for monitoring the rotor blades 22 (deflections, tip speed ratio, etc.); generator sensors 50 for monitoring the torque, the rotational speed, the acceleration and/or the power output of the generator 24; wind sensors 52 for monitoring the wind speed; and/or shaft sensors 54 for measuring the loads acting on the rotor shaft 34 and/or the rotational speed of the rotor shaft 34. Additionally, the wind turbine 10 may include one or more tower sensors 56 for measuring the loads transmitted through the tower 12 and/or the acceleration of the tower 12. Of course, the wind turbine 10 may further include various other suitable sensors for measuring any other suitable loading and/or operational parameter of the wind turbine 10. For example, the wind turbine 10 may also include one or more sensors 57 (e.g., accelerometers) for monitoring the acceleration of the gearbox 38 and/or the acceleration of one or more structural components of the machine head (e.g., the generator frame, the main frame or bedplate, etc.).

It should be understood that the sensors as described herein may be any suitable sensors known in the art. For example, the sensors may include a proximity sensor, a pressure sensor, an accelerometer, a strain gauge, a speed encoder, a Miniature Inertial Measurement Unit (MIMU), a vibration sensor, a Miniature Inertial Measurement Unit (MIMU), and/or any other suitable sensors. As is generally understood, MIMUs may include any combination of three-dimensional (3-D) accelerometers, 3-D gyroscopes and 3-D magnetometers and thus, when mounted on and/or within a rotor blade 22, may be capable of providing various types of blade-related measurements, such as 3-D blade orientation (pitch, roll, yaw) measurements, 3D blade acceleration measurements, 3-D rate of turn measurements, 3D magnetic field measurements and/or the like. As will be described below, such measurements may then be transmitted to the controller 26 and subsequently analyzed to determine real-time values for one or more of the loading and/or operational parameters.

It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors may, for example, be used to generate signals relating to the condition being monitored, which can then be utilized by the controller 26 to determine the actual condition. For instance, as indicated above, MIMU sensors may be used to monitor one or more loading and/or operational parameters by providing various 3-D measurements, which may then be correlated to the loading and/or operational condition(s).

Referring now to FIG. 3, there is illustrated a block diagram of one embodiment of suitable components that may be included within the controller 26 in accordance with aspects of the present subject matter. As shown, the controller 26 may include one or more processor(s) 58 and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Communication module 62 may include, without limitation, a network interface controller (NIC), a network adapter, a transceiver, and/or any suitable communication device that enables controller 26 to operate as described herein. Communication module 62 may connect to a network (not shown) and/or to one or more data communication systems using any suitable communication protocol, such as a wired Ethernet protocol or a wireless Ethernet protocol. Further, the communications module 62 may include a sensor interface 64 (e.g., one or more analog-to-digital converters) to permit signals transmitted from the sensors 48, 50, 52, 54, 56, 57 (such as loading and/or operational parameters) to be converted into signals that can be understood and processed by the processors 58 as will be discussed in more detail below. It should be appreciated that the sensors 48, 50, 52, 54, 56, 57 may be communicatively coupled to the communications module 62 using any suitable means. For example, as shown in FIG. 3, the sensors 48, 50, 52, 54, 56, 57 are coupled to the sensor interface 64 via a wired connection. However, in other embodiments, the sensors 48, 50, 52, 54, 56, 57 may be coupled to the sensor interface 64 via a wireless connection, such as by using any suitable wireless communications protocol known in the art.

During start-up and/or operation of the wind turbine 10, rotation of the rotor 18 induces vibrations into various wind turbine components. In addition, typical wind turbines and rotary machines as described herein operate in a high-noise environment. Such an environment typically generates data signals that have a low signal-to-noise ratio, for example, less than 1:1. The signal-to-noise ratio as described herein is generally defined as a ratio of the level of a desired signal to the level of background noise. Thus, a low signal-to-noise ratio (lower than 1:1) indicates less signal than noise and a ratio higher than 1:1 indicates more signal than noise. Though the system and method of the present disclosure is described herein as being suitable for high noise environments, it should be understood by those of ordinary skill in the art that the present disclosure is also suitable for any other environments as well.

The sensors 48, 50, 52, 54, 56, 57 are configured to detect and measure vibrations and transmit a signal representative of the vibration measurements for at least one revolution of the wind turbine 10 to the controller 26 for processing and/or analysis. For example, FIG. 4 illustrates one embodiment of a measured vibration signal 75 according to the present disclosure. As shown, the vibration signal 75 typically includes a plurality of frequency components, such as, without limitation, one or more rotor vibration frequencies, and/or one or more noise frequencies. In certain embodiments, the vibration signal 75 may be initially filtered so as to remove unwanted frequency content before modulation to decrease aliasing in the modulating signals. More specifically, in one embodiment, the vibration signal 75 may be initially filtered via at least one of a band-pass filter or a high-pass filter. In addition, any DC offset 72 may be removed from the vibration signal 75 before it is further processed and/or analyzed.

Referring now to FIG. 5, the processor 58 is configured to receive sensor data 70 (e.g. vibration signal 75) from at least one of the sensors 48, 50, 52, 54, 56, 57 during operation of the wind turbine 10 such that the signal 75 can be further processed and/or analyzed. The vibration signal may then be modulated at a desired frequency to generate one or more modulated signals so as to convert the vibration signal to a DC value. For example, as shown, the processor 58 includes a frequency modulator 80 that is configured to receive the vibration signal 75 and systematically vary the frequency of the signal 75 using a suitable algorithm. More specifically, as shown in FIGS. 5 and 6, the frequency modulator 80 modulates the vibration signal 75 at a desired frequency of certain Sine and Cosine waveforms 82, 84. In a particular embodiment, the frequency modulator 80 is configured to multiply the frequency of the vibration signal 75 with the desired frequency of the Sine and Cosine waveforms 82, 84 to determine a modulated signal(s). In certain embodiments, the desired frequency of the Sine and Cosine waveforms 82, 84 varies as a function of an operational parameter of the wind turbine 10. For example, in one embodiment, the desired frequency of the Sine and Cosine waveforms 82, 84 may correspond to a varying operational parameter of the wind turbine 10, such as a rotor and/or generator speed 78, a position of one or more components of the wind turbine 10, harmonics of one of more components of the wind turbine 10, or any other suitable operational parameter or combination thereof. More specifically, as shown in illustrated embodiment of FIG. 5, the rotor position 74 of the wind turbine 10 may be calculated via integrator 76 which integrates the high-resolution generator speed 78 scaled as to rotor speed.

Thus, when the measured signal 75 is modulated at the desired frequency, the measured signal is converted to DC values (i.e. the modulated signal(s) 83, 85) that can be easily filtered, as shown in FIG. 7. More specifically, modulating the vibration signal 75 moves the desired signal to a DC value, which makes the signal easier to filter using a simple low-pass filter (as will be discussed in more detail below). The unwanted frequencies are also shifted to other frequencies, but the low-pass filter will remove them. Further, as shown, the original vibration signal 75 is modulated at certain desired frequencies to generate a Sine modulated signal 83 and a Cosine modulated signal 85. Thus, as shown in FIG. 4, the modulated signal(s) 83, 85 can be further attenuated and filtered to extract the amplitude 96 of the frequency from the original vibration signal. More specifically, the frequency modulator 80 may be configured to determine an attenuation factor 86 that automatically generates a time constant for the filtering assembly 88 based on, for example, the rotor speed.

Referring still to FIG. 5, the filtering assembly 88 includes one or more low-pass filters (LPF) that are configured to filter the modulated signal(s) 83, 85. For example, as shown, low-pass filter 90 is used to filter the Cosine modulated signal 85 and low-pass filter 92 is used to filter the Sine modulated signal 83, for a total of two low-pass filters. In still additional embodiments, the filtering assembly 88 may include more than two or less than two low-pass filters. In further embodiments, it should be understood that any number of low-pass filters can be utilized. In addition, it should be understood by those of ordinary skill in the art that the number of filters can be chosen so as to maximize DC rejection, while also balancing the increase in phase shift and required sample size. A low-pass filter, as described herein, is a filter that passes low-frequency signals and attenuates (i.e. reduces the amplitude of) signals with frequencies higher than the cutoff frequency. Thus, in one embodiment, the modulated signal(s) 83, 85, which include the low-frequency DC component of the original vibration signal 75, can be easily filtered to eliminate any high frequency signals, as shown by the filtered signals 93, 95 of FIG. 8.

After filtering, the processor 58 can easily extract the amplitude of the filtered signal via a filter output processor 94. For example, as shown in the embodiment of FIG. 5, the output signals from the filtering assembly 88, which includes the filtered Cosine modulated signal 85 and the filtered Sine modulated signal 83, can be squared and added together to determine an output signal. In a particular embodiment, the processor 58 then calculates the square root of the output signal and multiplies by two to determine the amplitude 96 of the signal. Next, the processor 58 compares the amplitude 96 of the output signal to a threshold amplitude for one or more components of the wind turbine 10. The threshold amplitude is indicative of an imbalance within one or more components of the wind turbine 10, and therefore is chosen so as to ensure safe operation of the wind turbine 10. In one embodiment, for example, the processor 58 determines the threshold amplitude based on one or more field measurements that are indicate of safe operation of the wind turbine 10. More specifically, in a particular embodiment, the threshold amplitude is determined by first perfectly or near perfectly balancing the wind turbine 10. After the wind turbine 10 is balanced, the sensors are configured to measure one or more initial oscillations that occur during start up and/or operation of the wind turbine 10. The processor 58 can then optionally store the information in the memory device 60. Next, the processor 58 alters one or more operational parameters of the wind turbine 10 and measures at least one subsequent oscillations of the wind turbine 10 in response to altering one or more parameters. Thus, the processor 58 is configured to determine a difference between the initial oscillations and the subsequent oscillations. Based on the difference, the processor 58 determines the threshold amplitude for one or more components of the wind turbine 10. In additional embodiments, the threshold amplitude may be determined using any other suitable means, e.g. using a computer model, using data from similar wind turbine in similar wind farms, etc.

After the amplitude 96 of the filtered signal is determined, the controller 26 is configured to operate the wind turbine 10 based on the comparison of the amplitude 96 and the threshold amplitude so as to protect the wind turbine 10 from damage caused by an imbalance within one or more wind turbine components. For example, if the amplitude 96 of the filtered output signal exceeds the threshold amplitude, the controller 26 is configured to implement a corrective action 98 to the wind turbine 10. In several embodiments, the corrective action 98 may include shutting down the wind turbine 10 or temporarily de-rating the wind turbine 10 to permit the loads acting on or more of the wind turbine components to be reduced or otherwise controlled. For example, de-rating the wind turbine 10 may include speed de-rating, torque de-rating or a combination of both, or pitching one or more of the rotor blades 22 about its pitch axis 28. More specifically, the controller 26 may generally control each pitch adjustment mechanism 32 in order to alter the pitch angle of each rotor blade 22 between 0 degrees (i.e., a power position of the rotor blade 22) and 90 degrees (i.e., a feathered position of the rotor blade 22). In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24. The wind turbine 10 may also be temporarily de-rated by yawing the nacelle 16 to change the angle of the nacelle 16 relative to the direction of the wind. In other embodiments, the controller 26 may be configured to actuate one or more mechanical brake(s) in order to reduce the rotational speed of the rotor blades 22, thereby reducing component loading. In still further embodiments, de-rating the wind turbine 10 may include the controller 26 activating one or more airflow modifying elements on one or more of the rotor blades 22. For example, the controller 26 may activate one or more spoilers or flaps on the surface of one or more of the rotor blades 22. Additionally, the controller 26 may be configured to implement any appropriate corrective action known in the art. In even further embodiments, the loads on the wind turbine components may be reduced by performing a combination of two or more corrective actions, such as by altering the pitch angle of one or more of the rotor blades 22 together with modifying the torque demand on the generator 24.

Referring now to FIG. 9, a flow diagram of an exemplary method 100 for protecting for identifying an imbalance condition within a rotary machine in a high noise environment is illustrated. In an exemplary embodiment, instructions and/or data for method 100 are stored in a computer readable medium, such as memory device 60 (FIG. 3), and the instructions are executed by processor 58 (FIG. 3) to perform the steps of method 100. As shown, the method 100 includes a step 102 of measuring, by at least one sensor, a vibration signal during operation of the rotary machine. A next step 104 includes modulating the vibration signal at a desired frequency to generate a modulated signal so as to convert the vibration signal to a DC value, wherein the desired frequency varies as a function of an operational parameter of the rotary machine. Another step 106 includes filtering the modulated signal via one or more sensors. The method 100 also includes a step 108 of comparing an amplitude of the filtered signal to a threshold amplitude for one or more components of the rotary machine, the threshold amplitude being indicative of an imbalance within one or more components of the rotary machine. The method 100 may also include a step 110 of operating the rotary machine based on the comparison so as to protect the rotary machine from damage caused by the imbalance within the one or more components of the rotary machine.

Exemplary embodiments of methods and systems for protecting a rotary machine in a high noise environment are described above in detail. The methods and systems are not limited to the specific embodiments described herein, but rather, components of the systems and/or steps of the methods may be utilized independently and separately from other components and/or steps described herein. For example, the methods may also be used in combination with other measuring systems and methods, and are not limited to practice with only the rotary machines as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for identifying an imbalance condition within a rotary machine in a high noise environment, the method comprising:
    measuring, by at least one sensor, a vibration signal during operation of the rotary machine;
    modulating the vibration signal at a desired frequency to generate a modulated signal having a direct current (DC) value, wherein the desired frequency varies as a function of an operational parameter of the rotary machine, the operational parameter comprising at least one of a speed of the rotary machine or a rotor position of the rotary machine;
    filtering the modulated signal via one or more filters to generate a filtered modulated signal; and, the filtering further comprising generating and applying an attenuation factor to the low-pass filter that automatically varies a time constant of the low pass filter based on the operational parameter
    comparing an amplitude of the filtered modulated signal to a threshold amplitude for one or more components of the rotary machine, the threshold amplitude being indicative of an imbalance within one or more components of the rotary machine.

2. The method of claim 1, further comprising implementing a corrective action to the rotary machine when the amplitude of the filtered signal exceeds the threshold amplitude so as to protect the rotary machine from damage caused by the imbalance within the one or more components of the rotary machine.

3. The method of claim 2, wherein the corrective action comprises at least one of shutting down the rotary machine or de-rating the rotary machine.

4. The method of claim 1, wherein modulating the vibration signal comprises multiplying the frequency of the vibration signal with sinusoidals of the desired frequency.

5. The method of claim 1, wherein the one or more filters comprise at least two low-pass filters.

6. The method of claim 1, further comprising filtering the vibration signal before modulating the vibration signal via at least one of a band-pass filter or a high-pass filter.

7. The method of claim 1, wherein the at least one sensor comprises at least one of a proximity sensor, an accelerometer, a strain gauge, a speed encoder, a Miniature Inertial Measurement Unit (MIMU), or a vibration sensor.

8. The method of claim 1, wherein the vibration signal has a signal-to-noise ratio of less than 1:1.

9. The method of claim 1, further comprising determining the threshold amplitude based on one or more field measurements that are indicative of safe operation of the rotary machine, wherein determining the threshold amplitude based on one or more field measurements further comprises:
    balancing the rotary machine;
    measuring one or more initial oscillations during operation of the rotary machine;
    altering one or more operational parameters of the rotary machine;
    measuring one or more subsequent oscillations of the rotary machine in response to altering the one or more operational parameters of the rotary machine;
    determining a difference between the initial oscillations and the subsequent oscillations; and,
    based on the difference, determining the threshold amplitude for one or more components of the rotary machine.

10. The method of claim 1, wherein the rotary machine comprises at least one of a wind turbine, a gas turbine, a hydroelectric generator, or a steam turbine.

11. The method of claim 1, further comprising removing a DC offset from the vibration signal before modulating the vibration signal at a desired frequency.

12. A system for protecting a rotary machine in a high noise environment, the system comprising:
    one or more sensors configured to measure a vibration signal during operation of the rotary machine;
    a processor communicatively coupled to the one or more sensors, the processor configured to perform the following operations:
        modulating the vibration signal at a desired frequency to generate a modulated signal having a direct current (DC) value, wherein the desired frequency varies as a function of an operational parameter of the rotary machine, the operational parameter comprising at least one of a speed of the rotary machine or a rotor position of the rotary machine,
        filtering the modulated signal via one or more filters to generate a filtered modulated signal by generating and applying an attenuation factor to the a low-pass filter that automatically varies a time constant of the low-pass filter based on the operational parameter, and
        comparing an amplitude of the filtered modulated signal to a threshold amplitude for one or more components of the rotary machine, the threshold amplitude being indicative of an imbalance within one or more components of the rotary machine; and,
    a controller communicatively coupled to the processor, the controller configured to perform one or more operations, the operations comprising:
        operating the rotary machine based on the comparison so as to protect the rotary machine from damage caused by the imbalance within the one or more components of the rotary machine.

13. A method for protecting a wind turbine in a high noise environment, the method comprising:
   measuring, by at least one sensor, a vibration signal during operation of the wind turbine;
   modulating the vibration signal at a desired frequency to generate a modulated signal having a direct current (DC) value, wherein the desired frequency varies as a function of an operational parameter of the wind turbine, the operational parameter comprising at least one of a speed of the rotary machine or a rotor position of the rotary machine;
   filtering the modulated signal via one or more filters to generate a filtered modulated signal, the filtering further comprising generating and applying an attenuation factor to the a low-pass filter that automatically varies a time constant of the low-pass filter based on the operational parameter;
   comparing an amplitude of the filtered modulated signal to a threshold amplitude for a rotor of the wind turbine, the threshold amplitude being indicative of an imbalance of the rotor of the wind turbine; and,
   operating the wind turbine based on the comparison so as to protect the wind turbine from damage caused by the imbalance of the one or more components of the wind turbine.

14. The method of claim 13, wherein modulating the vibration signal comprises multiplying the frequency of the vibration signal with sinusoidals of the desired frequency.

15. The method of claim 13, wherein the one or more filters comprises two low-pass filters.

16. The method of claim 13, further comprising filtering the vibration signal before modulating the vibration signal via at least one of a band-pass filter or a high-pass filter.

17. The method of claim 13, wherein the at least one sensor comprises at least one of a proximity sensor, an accelerometer, a strain gauge, a speed encoder, a Miniature Inertial Measurement Unit (MIMU), or a vibration sensor.

18. The method of claim 17, wherein operating the wind turbine based on the comparison further comprises at least one of shutting down the wind turbine or de-rating the wind turbine when the amplitude of the filtered signal exceeds the threshold amplitude.

19. The method of claim 13, further comprising determining the threshold amplitude based on one or more field measurements that are indicate of safe operation of the wind turbine, wherein determining the threshold amplitude further comprises:
   balancing the wind turbine;
   measuring one or more initial oscillations during operation of the wind turbine;
   altering one or more operational parameters of the wind turbine;
   measuring one or more subsequent oscillations of the wind turbine in response to altering the one or more operational parameters of the wind turbine;
   determining a difference between the initial oscillations and the subsequent oscillations; and,
   based on the difference, determining the threshold amplitude for one or more components of the wind turbine.

20. The method of claim 13, further comprising removing a DC offset from the vibration signal before modulating the vibration signal at a desired frequency.

* * * * *